(12) United States Patent
Hamid

(10) Patent No.: US 7,356,169 B2
(45) Date of Patent: Apr. 8, 2008

(54) METHOD AND SYSTEM FOR TRANSFORMING AN IMAGE OF A BIOLOGICAL SURFACE

(75) Inventor: Laurence Hamid, Ottawa (CA)

(73) Assignee: Activcard Ireland Limited, Dublin (IE)

(*) Notice: Subject to any disclaimer, the term of this patent is extended or adjusted under 35 U.S.C. 154(b) by 536 days.

(21) Appl. No.: 10/173,754

(22) Filed: Jun. 19, 2002

(65) Prior Publication Data
US 2003/0007670 A1    Jan. 9, 2003

Related U.S. Application Data

(60) Provisional application No. 60/300,833, filed on Jun. 27, 2001.

(51) Int. Cl.
G06K 9/00 (2006.01)
(52) U.S. Cl. .................................... 382/124
(58) Field of Classification Search ............... 382/124, 382/126
See application file for complete search history.

(56) References Cited

U.S. PATENT DOCUMENTS

| | | |
|---|---|---|
| 4,109,237 A | 8/1978 | Hill |
| 4,353,056 A | 10/1982 | Tsikos |
| 4,792,226 A * | 12/1988 | Fishbine et al. ............... 356/71 |
| 5,109,427 A | 4/1992 | Yang |
| 5,187,748 A | 2/1993 | Lee |
| 5,233,404 A | 8/1993 | Lougheed et al. |
| 5,291,560 A | 3/1994 | Daugman |
| 5,325,442 A | 6/1994 | Knapp |
| 5,351,304 A | 9/1994 | Yamamoto |
| 5,493,621 A * | 2/1996 | Matsumura ................ 382/125 |
| 5,689,576 A * | 11/1997 | Schneider et al. .......... 382/124 |
| 5,883,971 A * | 3/1999 | Bolle et al. ................. 382/124 |

(Continued)

FOREIGN PATENT DOCUMENTS

JP    11045336    2/1999

(Continued)

OTHER PUBLICATIONS

Fernando Podio et al. "CBEFF: Common Biometric Exchange File Format" Jan. 3, 2001. NISTIR 6529.*

(Continued)

*Primary Examiner*—Matthew C. Bella
*Assistant Examiner*—Tom Y Lu
(74) *Attorney, Agent, or Firm*—Woodcock Washburn LLP

(57) ABSTRACT

Provided is a method of transforming an image of a biometric surface comprising the steps of sensing a biometric surface to provide biometric image data, receiving data relating to a plurality of parameters for use in transforming image data different parameters for resulting in differently transformed image data for a same biometric image data, the data received from another processor, transforming the biometric image data in accordance with the received data to provide transformed biometric image data in a format relating to the received data, and providing the transformed biometric image data as output image data having the format, wherein the transformed biometric image data is different for different parameters enabling provision of images of a same biometric surface having different image formats. There is further provided a biometric imaging device for executing the above described method, as well as memory for storing data, relevant to the above-described method.

51 Claims, 4 Drawing Sheets

U.S. PATENT DOCUMENTS

| | | | |
|---|---|---|---|
| 5,890,808 A * | 4/1999 | Neff et al. | 382/209 |
| 5,917,928 A | 6/1999 | Shpuntov et al. | |
| 6,094,499 A * | 7/2000 | Nakajima et al. | 382/124 |
| 6,097,035 A * | 8/2000 | Belongie et al. | 250/556 |
| 6,111,978 A | 8/2000 | Bolle et al. | |
| 6,262,091 B1 | 7/2001 | Wagner et al. | |
| 6,266,433 B1 | 7/2001 | Bolle et al. | |
| 6,289,112 B1 | 9/2001 | Jain et al. | |
| 6,324,297 B1 * | 11/2001 | Uchida | 382/125 |
| 6,333,989 B1 * | 12/2001 | Borza | 382/124 |
| 6,668,072 B1 * | 12/2003 | Hribernig et al. | 382/124 |
| 6,687,391 B1 * | 2/2004 | Scott et al. | 382/126 |
| 2002/0028004 A1 * | 3/2002 | Miura et al. | 382/124 |

FOREIGN PATENT DOCUMENTS

WO     WO 98/58342     12/1998

OTHER PUBLICATIONS

Jain et al., "Combining Multiple Matchers for a High Security Fingerprint Verification System", Pattern Recognition Letters, North-Holland Publ. Amsterdam, NL, vol. 20, No. 11-13, pp. 1371-1379, Nov. 1999.

* cited by examiner

METHOD AND SYSTEM FOR TRANSFORMING AN IMAGE OF A BIOLOGICAL SURFACE

This application claims the benefit from U.S. Provisional Application No. 60/300,833 filed on Jun. 27, 2001.

FIELD OF THE INVENTION

This invention relates generally to biometric imaging devices for imaging biological structures, and more particularly to swipe imaging devices for imaging biological surfaces.

BACKGROUND OF THE INVENTION

In today's world of electronic communication and commerce, the ability to identify a person for the purposes of security in remote transactions is paramount. A common form of security is a simple password, which, for example, is entered when a user wishes to access a computer network, or a personal identification card, which is widely used in, for example, bank automatic teller machines. Another way of ensuring the identity of a user is to capture and encode a biometric from the party and compare the result with a previously stored, or enrolled, result, for example stored on a remote database system. A biometric, for the present purposes, is a statistical or quantitative measure of a biological feature of a person. A robust biometric is one which can be used reliably and repeatedly to identify a person.

The best known robust biometric, used for identification purposes, is a fingerprint. Fingerprint analysis is amongst the most widely used and studied biometric techniques. The many new and exciting developments, which have taken place in the field of fingerprint science, are for example summarized in the monograph *Advances in Fingerprint Technology*, 2$^{nd}$ ed., edited by H. C. Lee and R. E. Gaensslen (CRC Press, 2001).

Typically in electronic fingerprint matching, a live fingerprint is scanned and electronically digitized. The digitized data generally contains information pertaining to characteristic features of the fingerprint, such as ridge endings, points of ridge bifurcation, and the core of a whorl, i.e. fingerprint minutiae. The digitized data is then analyzed and compared with stored data relating to fingerprints that have been obtained previously from corresponding authorized persons, i.e. fingerprint templates. When a match is detected, within a predetermined level of security in the form of a predetermined false acceptance rate, the individual is identified and a corresponding action is performed.

There exist many different devices, which are used in sensing the image of a human fingerprint, like optical systems as described for example in U.S. Pat. No. 5,109,427 to Yang, dated Apr. 28, 1992, in U.S. Pat. No. 5,187,748 to Lee, dated Feb. 16, 1993, or in U.S. Pat. No. 5,233,404 to Lougheed et al., dated Aug. 3, 1993, or capacitive contact imaging devices, as described for example in U.S. Pat. No. 4,353,056 to Tsikos, dated Oct. 5, 1982, in U.S. Pat. No. 5,325,442 to Knapp, dated Jun. 28, 1994, or in U.S. Pat. No. 6,333,989 to Borza, dated Dec. 25, 2001.

Different imaging devices usually provide sensed image data in different formats, the formats being most appropriate to the particular features of said imaging devices. On the other hand, the different software solutions developed for the analysis of fingerprint minutiae expect the data to be analyzed to obey certain predefined format specifications. In many cases, well-established analysis and authentication programs are restricted to the use of a particular hardware implementation of a biometric sensor. Also, different biometric sensors often operate only with one specific software implementation of an analysis and authentication method.

It would be highly advantageous to provide a system, which comprises a standardized, but flexible data interface, so that the data transfer from the biometric imaging device to the analysis software occurs according to user specified parameters. This way, it is possible that many different analysis and authentication software can use a same biometric sensing device.

OBJECT OF THE INVENTION

It is therefore an object of the present invention to provide a system and method for transforming image data sensed by a biometric sensing device according to user-specific transform parameters.

It is further an object of the present invention to provide a standardized flexible interface for the data communication between biometric imaging hardware, and analysis and authentication software.

SUMMARY OF THE INVENTION

In accordance with an aspect of the present invention, there is provided a method of transforming an image of a biometric surface comprising the steps of sensing a biometric surface to provide biometric image data, receiving data relating to a plurality of parameters for use in transforming image data of the different parameters for resulting in differently transformed image data for a same biometric image data, the data received from another processor, transforming the biometric image data in accordance with the received data to provide transformed biometric image data in a format relating to the received data, and providing the transformed biometric image data as output image data having the format, wherein the transformed biometric image data is different for different parameters enabling provision of images of a same biometric surface having different image formats. Optionally, the method comprises the steps of providing template image data of a predetermined biometric surface and comparing the output image data to template image data for identifying the person.

In accordance with an aspect of the present invention, there is further provided biometric imaging device for imaging a biometric surface, the biometric imaging device comprising memory for storing a plurality of transform parameters, a transceiver for receiving transform parameters, for providing received transform parameters for storage in the memory and for transmitting a signal in dependence upon data received, the signal for being transmitted to a receiver coupled with a host processor, a sensing device for sensing the biometric surface and for providing sensed data relating to an image of the biometric surface, and a processor for transforming the sensed data into transformed data relating to a transformed image in accordance with the plurality of transform parameters and for providing the transformed image from the format, wherein the transformed biometric image data is different for different received parameters enabling provision of images of a same biometric surface having different image formats from a same biometric imaging device.

In accordance with another aspect of the present invention, there is also provided memory for storing data, the memory having stored therein data relating to instructions for execution on a processor, the instructions for performing the steps of receiving data relating to a plurality of parameters for use in transforming image data of the different parameters for resulting in differently transformed image data for a same biometric image data, the data received from another processor, transforming the biometric image data in accordance with the received data to provide transformed biometric image data in a format relating to the received data, and providing the transformed biometric image data as output image data having the format, wherein the transformed biometric image data is different parameters enabling provision of images of a same biometric surface having different image formats.

BRIEF DESCRIPTION OF THE DRAWINGS

An exemplary embodiment of the invention will be described in conjunction with the following drawings, in which similar reference numbers designate similar items.

DETAILED DESCRIPTION OF THE INVENTION

Figure 1A:
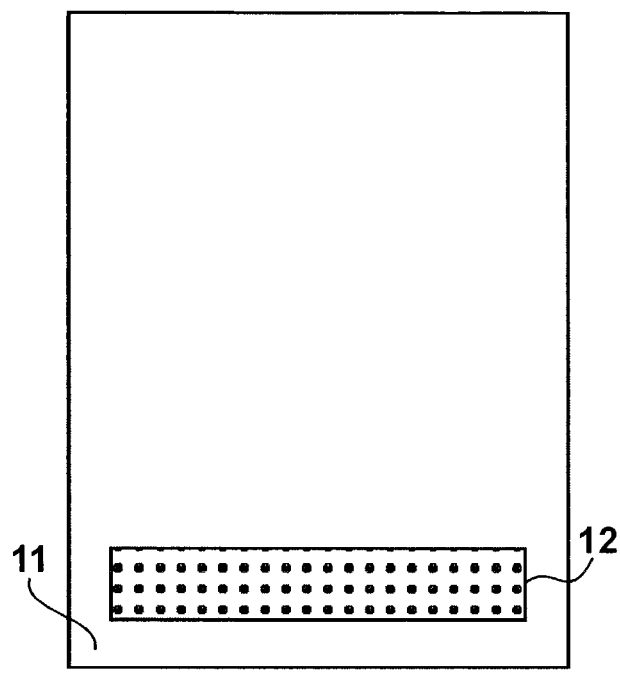
FIG. 1a is a simplified block diagram of a sensing device showing a sensing pad comprising a linear capacitive sensing array.

Many different methods have been proposed for biometric identifications. As mentioned above, fingerprint analysis is by far the best-studied and most common technique. However, out of various possibilities, there has also been proposed the use of features of a human eye as robust biometrics for identification purposes. For example, U.S. Pat. No. 4,109,237 to Hill, dated Aug. 27, 1978, describes the use of retinal vasculature patterns, and U.S. Pat. No. 5,291,560 to Daugman, dated Mar. 1, 1994, describes a method of encoding the image of an iris into a 256-byte iris code. It has been shown that such a code can be used as a very reliable personal identifier. Also, pore prints, palm prints, iris recognition, facial recognition and so forth have been studied and proposed.

The prevalent methods of fingerprint authentication and identification are based on minutiae features. The systems, which utilize such features, generally utilize processing of the fingerprint images to obtain accurate and reliable minutiae features. These features effectively determine the identity of a person. Once the scanning process is finished, an image is acquired into a temporary storage device, and relevant minutiae features are extracted. Some techniques, such as capacitive swiping of fingerprint images, include as a prerequisite to minutiae analysis the formation of a composite image from a series of partial images. The resultant reliable features obtained from the minutiae analysis are used for matching the fingerprint images. In this context, a variety of different techniques regarding minutiae analysis have been described, such as a system and method for determining block direction in fingerprint images disclosed in U.S. Pat. No. 6,289,112 to Jain et al. dated Sep. 11, 2001, a system and method for determining ridge counts in fingerprint image processing disclosed in U.S. Pat. No. 6,266,433 to Bolle et al. dated Jul. 24, 2001, a system and method for identifying foreground and background portions of digitized images disclosed in U.S. Pat. No. 6,262,091 to Jain et al. dated Jul. 17, 2001, or a system and method for determining ridge counts in fingerprint image processing disclosed in U.S. Pat. No. 6,111,978 to Bolle et al. dated Aug. 29, 2000.

Once the minutiae analysis has been performed, the resulting characteristic data are compared to reference data. Reference data are for example data stored in a master data bank, or data stored on an individual user-specific personal identification card. Generally, there is a transformation required before it is possible to compare the sensed data to reference data. The data provided by the sensing device are transformed according to certain characteristic parameters, which are essential to the process of systematic data analysis and comparison. Depending on the type of imaging device that is used for sensing a biometric feature, and further depending on the identification characteristics of the fingerprint template, or on the software solution utilized in minutiae analysis, the size and the orientation of the sensed image has to be adjusted to allow for an adequate comparison.

The method and system of the present invention are now described with reference to a capacitive contact swipe imager for sensing a biological surface. Of course, the present invention is not restricted to swipe imagers, or to capacitive contact imagers, but is optionally used with optical imagers, thermal imagers, and other types of imaging devices. Further, the invention is not restricted to imaging a fingerprint or a biological surface, but generally applies to imaging any biological feature.

In the capacitive contact swipe imager, a biometric information source is passed over a sensing pad, and data is recorded during the motion of passing over. The sensing pad comprises a plurality of individual capacitive sense elements, which are typically arranged in arrays of rows and columns. Preferably, in order to generate an image for analysis, a capacitive sensing element is smaller than half the smallest feature size to be sensed. Empirical studies have shown that a square plate of about 50 µm edge length is suitable for fingerprint sensing.

The capacitive sensing elements are arranged as to form individual linear capacitive sensing arrays within a same sensing pad. Within each linear sensing array the rows are equally spaced by a given row spacing, and the columns are equally spaced by a given column spacing. Each linear capacitive sensing array has a capacitive detective area and a resolution, depending on an area and a number of rows and columns forming the linear capacitive sensing array. In practice there are about 10 rows and 200 columns of regularly spaced elements, occupying an area of approximately 0.1×2 $cm^2$, in a representative linear capacitive sensing array. The capacitive sensing element density of the linear capacitive sensing array, which is inversely proportional to the row spacing and the column spacing of the linear capacitive sensing array, determines the resolution of the linear capacitive sensing array.

Referring to FIG. 1a, a simplified block diagram of a first embodiment of the capacitive contact swipe imager is shown. A sensing pad 11 comprises a linear capacitive sensing array 12. The sensing pad has an area of approximately 0.1×2 cm for accepting a fingertip drawn across the sensing pad. In this example, the linear capacitive sensing array 12 comprises 10 rows and 300 columns. The linear capacitive sensing array 12 is connected through an analog switch matrix to facilitate reading of the image of a biological surface. Timing and sequencing logic (not shown) selects each element in the array, in turn, to produce a complete image of a fingerprint presented to the device.

During the swiping process, a series of partial snapshots of the fingerprint is recorded. The individual images have a sensing time difference τ, which is determined by the timing and sequencing logic. A reconstruction of a composite image representative of the biological surface scanned is based on finding overlapping areas between captured partial images; the reconstruction is achieved for example in a puzzle-like fashion. A processor (not shown) is used to correlate data corresponding to the individual partial images with each other and with previously stored sample data.

The capacitive contact swipe imager comprises a transceiver (not shown) for transmitting data from the capacitive contact swipe imager. The data are, for example, transmitted to a receiver, which is optionally coupled to a host processor. Further, there is provided memory (not shown), for example in the form of random-access memory, which is used to store temporary images, partial images, intermediate data, and the like. Optionally, the memory is used to store information provided by the user. In this case the capacitive contact swipe imager comprises an input port (not shown), which allows the user to access said memory. Optionally, the input port is the same transceiver that is used for transmitting the signal in dependence upon data received.

Figure 1B:
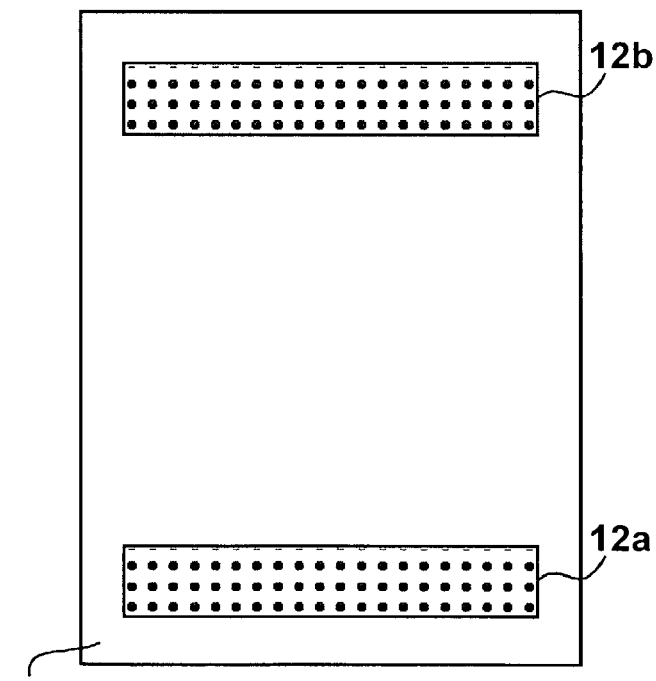
FIG. 1b is a simplified block diagram of a capacitive biometric sensing device featuring a sensing pad comprising two linear capacitive sensing arrays each having a same resolution.

Referring to FIG. 1b, a simplified block diagram of a second embodiment of the capacitive contact swipe imager is shown. The sensing pad 11 comprises two linear capacitive sensing arrays 12a and 12b. The row spacing of the first linear capacitive sensing array 12a is given as $\delta_1$. The second linear capacitive sensing array 12b is spaced away from the first array 12a by a spacing of $(N+1/2)\cdot\delta_1$, N being an integer. Both linear capacitive sensing arrays 12a and 12b are connected to the processor. A transceiver (not shown) is also provided.

By providing a spacing between the linear capacitive sensing arrays other than an integral multiple of the row spacing $\delta_1$, the regular pattern of sensing a biological surface is also modified such that in image reconstruction accurate alignment is now possible on the row and on the half row. Thus, an image of the biological surface is capable of being reconstructed with twice the resolution: one times the resolution on the row boundary and one times the resolution on the half row boundary when interleaved provides twice the resolution.

Prior to the step of comparison and authentication, the image data obtained from a biometric sensing device are analyzed for their characteristic features. Typical image analysis techniques for analyzing fingerprint images rely on a known image resolution and format. For example, most image analysis applications transform a captured image having known properties into another image with a series of other known properties using well-known techniques. The transformed image is in a format suitable to the image analysis application. In this fashion, a well-tested image analysis application is used on data that is reformatted to its particular requirements. New data transform processes are introduced, whenever the imaging device is changed, or when a plurality of different imaging devices is supported.

Figure 2:
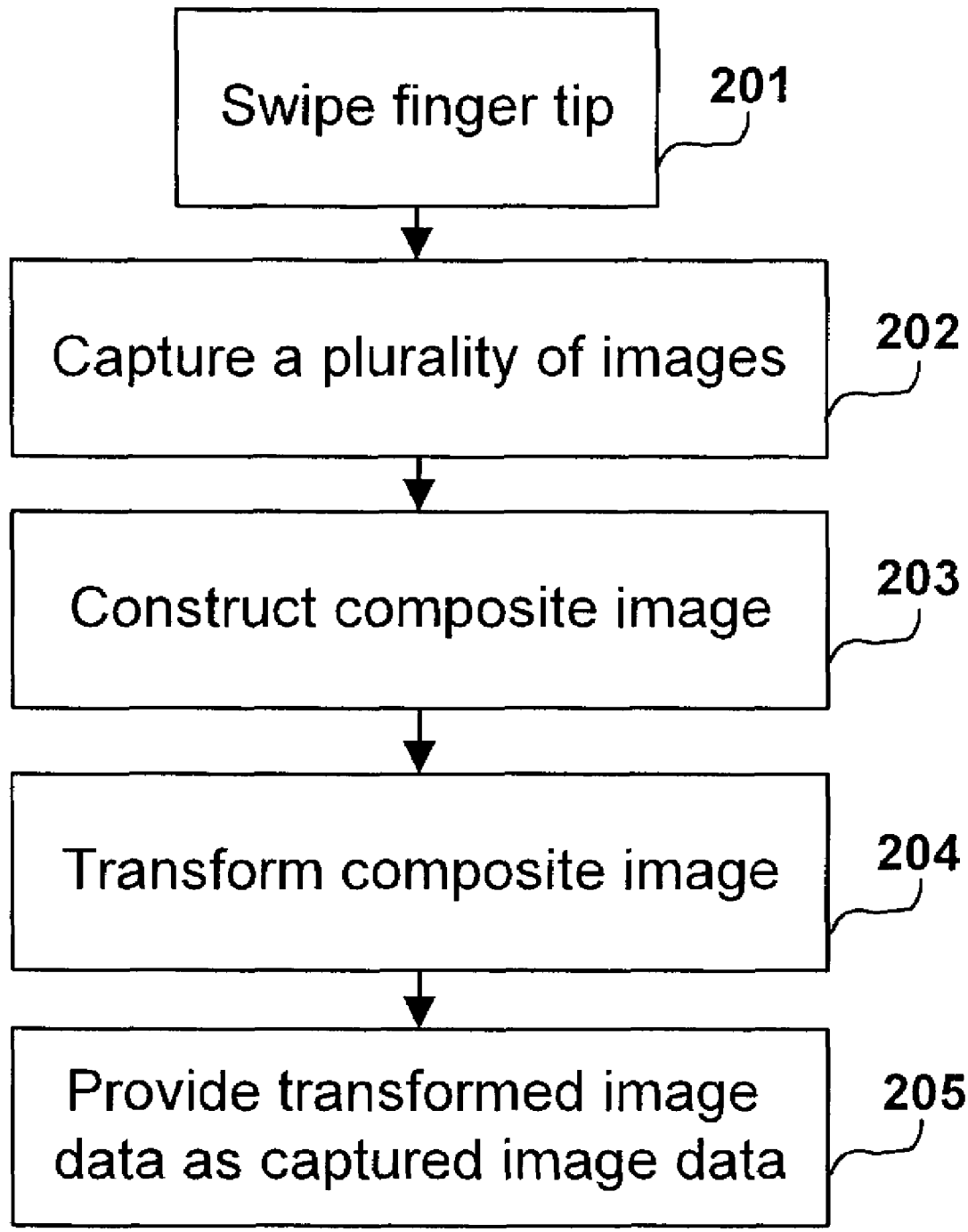
FIG. 2 is a simplified flow diagram of a method of image processing.

Referring to FIG. 2, a flow diagram is shown for imaging of the fingerprint using the capacitive contact swipe imager, and for provision of an image therefrom. A fingertip is passed over the sensing pad of the capacitive contact swipe imager, step 201, and is imaged in separate overlapping portions, step 202. A memory buffer within the capacitive contact swipe imager maintains the imaged portions, and a processor acts to construct an image of the fingertip from numerous scanned portions, step 203. The resulting image is not limited to a fixed area of the fingertip and as such, the buffer is sufficient in size to maintain a larger than normal fingerprint image.

Once the image is reconstructed in whole or in part, the processor transforms the constructed image in accordance with a set of known parameters, step 204. Typically, for fingerprint images, the transformation provides a known resolution and a known image size. For example, a 200×200 pixel image is provided covering an area of 1 cm$^2$. Of course, depending on the imaged area and the amount of image data it is possible with a single same linear capacitive sensing array and processor to support a plurality of different image processing methods and applications. It is also possible to provide additional image data from the capacitive contact swipe imager to allow for selection of an area of interest by the image analysis application. By transforming the sensed data, the processor achieving the transformation functions as an interface between sensing hardware and analysis software. Once the transformation is achieved, the transformed image data are provided as captured image data, step 205. The captured image data are optionally provided according to industry standard data formats such as header contents and image pixel depth.

Referring to Table 1, a set of relevant parameters and their meaning is shown. Resolution 101 refers to a number of sensed data points along a known distance. For example, a resolution of 100 data points per centimeter is possible. Alternatively, resolution is different along horizontal and vertical directions allowing for more or less data points per cm along either dimension. It is clear from the above description of the embodiments of capacitive contact swipe imagers that the resolution of the capacitive contact swipe imager is easily modified through the choice of number of individual linear arrays, and their individual characteristics, such as number of rows, row spacing, or column spacing.

Image area 102 refers to an image dimension in data points such as 100×200 data points. In this example, 20,000 data points are within the image area. When image area is expressed in absolute terms, like 1 cm×1 cm, the conversion is straightforward based on the resolution. Here it results in 100×100 data points for a total of 10,000 data points.

Data point depth 103 refers to an amount of data per data point—per pixel—and is usually expressed in bits. A 1 bit depth provides a black and white image. An 8 bit depth provides for 254 shades of gray, black and white within the image.

Image rotation 104 refers to image rotation relative to a known identifier within the image or relative to the imager. For example, an imager set up to capture fingerprint images in a given orientation may invert the images prior to providing image data for analysis.

TABLE 1

Parameters for fingerprint data transformation

| Parameter | | Unit | Size |
| --- | --- | --- | --- |
| 101 Resolution Data | Vertical | point/cm | 100 |
| | Horizontal | point/cm | 100 |
| 102 Image Area | Vertical | pixel | 400 |
| | Horizontal | pixel | 640 |
| 103 Depth | | bit | 8 |
| 104 Image Rotation | | degree | 0 |

Figure 3:
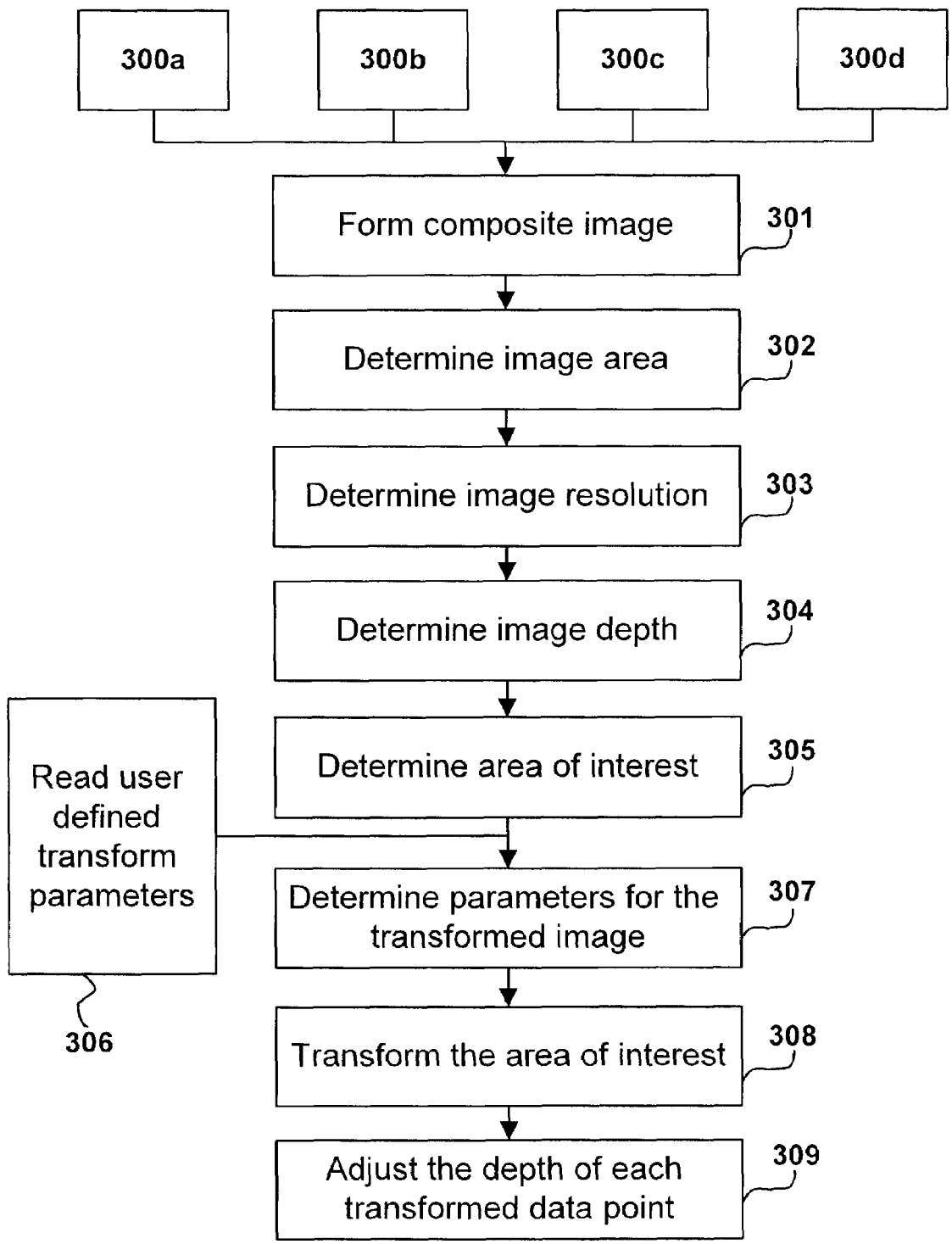
FIG. 3 is another simplified flow diagram of a method of transforming image data in size and resolution; and, FIG. 4 is another simplified flow diagram of a method of transforming image data in size and resolution.

Referring to FIG. 3, a simplified flow diagram of a method of transforming the data is shown. Data are provided from a biometric sensing device, such as the capacitive contact swipe imager 300a, an optical sensing system 300b, a thermal sensor 300c, or a retinal scanner 300d. In the ample of the capacitive contact swipe imager, partial images are captured and a single composite image is formed, step 301. An image area is then determined, step 302, the image having $A_h$ pixels in a horizontal extension, and $A_v$ pixels in a vertical extension. Next, an image resolution is determined, step 303, the image having a horizontal resolution $R_h$ and a vertical resolution $R_v$. Further, a data point depth $D_{bit}$ is established, step 304. In the present example, the image has the data point depth $D_{bit}$ of 24 bits. Also, an area of interest of the scanned image is defined, step 305. The user required parameters are read in, step 306, according to which are set for a transformed image a horizontal resolution $r_h$, a vertical resolution $r_v$, a horizontal pixel dimension, $a_h$, a vertical pixel dimension $a_v$, and a data point depth $d_{bit}$. In the present example, the data point depth $d_{bit}$ of 8 bits is desired. Next, the number of data points and other parameters for the transformed image are determined, step 307, and a determined area of interest is transformed into an area having the desired number of data points, step 308. When, the area of interest is a central region of the composite image, the composite image is transformed as follows:

According to the definitions given in Table 1, a ratio Area/Resolution results in a distance in cm. Therefore, the ratio $A_h/r_h$ determines the absolute horizontal distance $d_h$ across the transformed image, and the ratio $A_h/R_h$ determines the absolute horizontal distance $D_h$ across the composite image. Provided that $D_h > d_h$, the expression $\Delta_h = (D_h - d_h)/2$ describes an extra horizontal distance within the composite image at either of the horizontal sides of said image, measured parallel to a vertical extension, starting from a horizontal edge. Multiplying $\Delta_h$ by the resolution $A_h$ results in a number of pixels to be trimmed from both horizontal sides of the composite image. An analogous process is applied in the vertical direction resulting in a trimmed image of the appropriate sized physical area. The image is then transformed to decrease a number of data points along either or both directions. A simple method of achieving this is to erase data points in proportion to the change—if two thirds of the rows are desired, erase every third row—or, preferably, to apply interpolation techniques to more accurately reconstruct the data as it would have been sensed if it were sensed at the desired resolution. For example, a function indicative of the data point values is determined approximately and then used to generate the transformed data.

A similar process is used to increase the number of data points. Some data points are duplicated—to increase the number of rows to twice the number of rows, simply duplicate each row—or, once again preferably, mathematical processes are used to better insert data and to modify sensed data in accordance with the predicted surface form. A plurality of interpolations techniques has been well established in the field of image and picture processing.

Once the area and resolution are as desired, the data points are truncated to a desired depth, step 309, and the resulting image is provided as a sensed image. In this fashion, a same capacitive contact swipe imager is useful with many different applications for image analyses. Further, when the capacitive contact swipe imager is aware of the desired parameters, it is optionally possible to increase the quality of the transformed data by modifying the composite image reconstruction process, or even by modifying the image capture process.

The above example refers to fingerprint imaging using a capacitive contact swipe imager, but the system and method described are equally applicable to other contact based biometric imaging including palm scanning and skin imaging in general. Furthermore, the system and method of the present invention are easily extended to any kind of image analysis of a biological feature, in which grid pattern techniques are applied.

Figure 4:
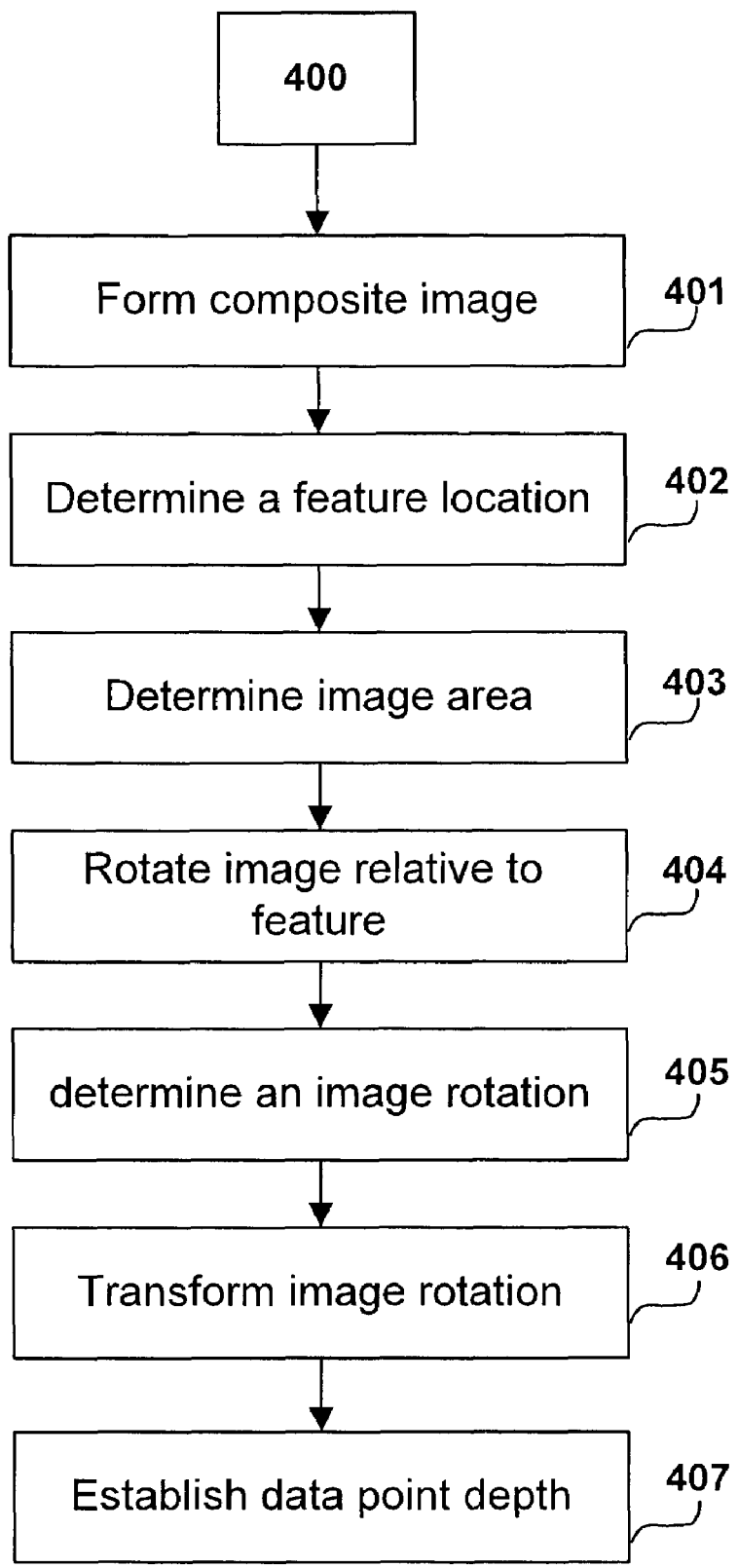

Referring to FIG. 4, a simplified flow diagram of a method of transforming the data is shown. Data are provided from a biometric sensing device, such as the capacitive contact swipe imager 400. Partial images are captured and a single composite image is formed, step 401. The image is then analyzed, step 402, to determine a feature location for a known feature. Typically, the feature is the core of the fingerprint image though the feature may be any reproducibly identifiable feature or features and need not remain a same feature for each fingerprint or individual. An image area relative to the identified feature is then determined, step 403, the image having a known amount of information—an image of a known area. Thus, when resolution changes are made to the image, the image area is unaffected. Typically, the image area is larger than the image area desired as an output image area such that during image rotation, areas of the image do not become unpopulated. Next the image is rotated relative to the identified feature at step 404. An image resolution is determined, step 405, the image having a horizontal resolution $R_h$ and a vertical resolution $R_v$. The image resolution is then transformed at step 406 such that a number of pixels along each axis is in accordance with the desired image size. Finally, a data point depth $D_{bit}$ is established, step 407.

Once the area, resolution, depth, angle and so forth are in accordance with the parameters, the resulting image is provided as a sensed image. In this fashion, a same capacitive contact swipe imager is useful with many different applications for image analyses. Further, when the capacitive contact swipe imager is aware of the desired parameters, it is optionally possible to increase the quality of the transformed data by modifying the composite image reconstruction process, or even by modifying the image capture process.

Although the present invention has been described with respect to specific embodiments thereof, various changes and modifications are optionally carried out by those skilled in the art without departing from the scope of the invention. Therefore, it is intended that the present invention encompass such changes and modifications as fall within the scope of the appended claims.

What is claimed is:

1. A method of transforming an image of a biometric surface, comprising the steps of:
   sensing the biometric surface using a contact imaging device to provide sensed biometric image data having at least two rows and two columns and image parameters including at least image resolution;
   receiving transform data relating to a plurality of transform parameters including at least image resolution for use in transforming the sensed biometric image data, wherein different transform parameters result in differently transformed image data for a same biometric image data;
   transforming the sensed biometric image data in accordance with the received transform data to provide transformed biometric image data in a biometric imaging data format other than a biometric imaging data format of the sensed biometric image data; and providing the transformed biometric image data as output image data, wherein the transformed biometric image data is different for different transform parameters enabling provision of images of a same biometric surface having different biometric imaging data formats.

2. A method for imaging a biometric surface according to claim 1, further comprising the steps of:

sensing a plurality of partial images using a contact swipe imager; and constructing a composite image from said partial images to provide a sensed biometric image.

3. A method for imaging a biometric surface according to claim 2, further comprising the step of capacitively sensing biometric image data of a biometric surface.

4. A method for imaging a biometric surface according to claim 2, wherein the transformed biometric image data represents a framed feature of the biometric surface.

5. A method for imaging a biometric surface according to claim 4, wherein the framed feature is transformed according to at least one of resolution, orientation, and line width.

6. A method for imaging a biometric surface according to claim 2, wherein the transformed biometric image data is transformed according to its frame size.

7. A method for imaging a biometric surface according to claim 2, wherein the transformed biometric image data is transformed according to a feature indicated in the parameters.

8. A method for imaging a biometric surface according to claim 2, wherein the output image data is provided to one of a plurality of different compatible analysis applications.

9. A method for imaging a biometric surface according to claim 8, wherein the step of transforming involves a same transform process for different ones of the compatible analysis applications, the same transform process transform result being variable in dependence upon the parameters.

10. A method for imaging a biometric surface according to claim 2, wherein the captured image data are provided according to industry standard biometric imaging data formats.

11. A method for imaging a biometric surface according to claim 2, wherein the biometric surface is a fingerprint.

12. A method of transforming an image of a biometric surface for use in identification of a person, comprising the steps of:

sensing the biometric surface using a contact imaging device to provide sensed biometric image data having at least two rows and two columns and image parameters including at least image resolution;

receiving transform data relating to a plurality of transform parameters including at least image resolution for use in transforming sensed biometric image data, wherein different transform parameters result in differently transformed image data for a same biometric image data;

transforming the sensed biometric image data in accordance with the received transform data to provide transformed biometric image data in a biometric imaging data format other than a biometric imaging data format of the sensed biometric image data;

providing the transformed biometric image data as output image data, wherein the transformed biometric image data is different for different transform parameters enabling provision of images of a same biometric surface having different biometric imaging data formats;

providing template image data of a predetermined biometric surface; and comparing the output image data to template image data for identifying the person.

13. A biometric imaging device for imaging a biometric surface, comprising:

a memory that stores a plurality of transform parameters including at least image resolution, wherein different transform parameters result in different transformed image data when used to transform for a same image data;

a sensing device that senses the biometric surface and that provides sensed biometric image data relating to an image of the biometric surface, said biometric image data having at least two rows and two columns and image parameters including at least image resolution; and a processor that transforms the sensed biometric image data into transformed data in one of a number of biometric imaging data formats in accordance with the plurality of transform parameters, wherein the transformed sensed biometric image data is different for different received transform parameters enabling provision of images of a same biometric surface having different biometric imaging data formats from a same biometric imaging device.

14. A biometric imaging device according to claim 13, wherein the sensing device is a contact swipe imager that senses data in the form of a plurality of partial images.

15. A biometric imaging device according to claim 14, further comprising a processor that constructs a composite image from said plurality of partial images.

16. A biometric imaging device according to claim 15, wherein the processor that transforms the sensed data is a same processor as the processor that constructs the composite image.

17. A biometric imaging device according to claim 13, wherein the sensing device is a capacitive sensing device.

18. A biometric imaging device according to claim 13, wherein the sensing device is a fingerprint sensor.

19. A biometric image interface for interfacing a biometric sensing device with an image analysis device, the biometric image interface comprising:

a memory that receives and stores a plurality of transform parameters from the image analysis device, the transform parameters including at least image resolution, wherein different transform parameters result in different transformed image data when used to transform for a same image data; and a processor that executes instructions for the biometric sensing device in accordance with the received transform parameters, transforms biometric data from the biometric sensing device into one of a number of biometric imaging data formats in accordance with the transform parameters, and transmits to the image analysis device output image data transformed in accordance with the received transform parameters, wherein transforming is performed differently for different transform parameters, thereby enabling provision of images of a same biometric surface having different biometric imaging data formats using a same biometric sensing device.

20. A biometric image interface according to claim 19, wherein the sensing device is a contact swipe imager that senses data in the form of a plurality of partial images.

21. A biometric image interface according to claim 19, wherein the sensing device is a capacitive sensing device.

22. A biometric image interface according to claim 19, wherein the sensing device is a fingerprint sensor.

23. A biometric image interface according to claim 19, wherein the image analysis device compares the transmitted output image data with template image data.

24. A computer readable medium having stored therein data relating to instructions for execution on a processor, the instructions for performing the steps of:

receiving transform data relating to a plurality of transform parameters including at least image resolution for use in transforming image data where different transform parameters result in differently transformed image data for a same biometric image data;

transforming the biometric image data in accordance with the received transform data to provide transformed biometric image data in a biometric imaging data format relating to the received transform data; and providing the transformed biometric image data as output image data having the biometric imaging data format relating to the received transform data, wherein the transformed biometric image data is different for different transform parameters enabling provision of images of a same biometric surface having different biometric imaging data formats.

25. A computer readable medium according to claim 24, the data including instructions for performing the steps of:

sensing a plurality of partial images using a contact swipe imager; and constructing a composite image from said partial images.

26. A computer readable medium according to claim 24, the data including instructions for performing the step of capacitively sensing image data of a biometric surface.

27. A computer readable medium according to claim 24, wherein the transformed biometric image data represents a framed feature of the biometric surface.

28. A computer readable medium according to claim 27, wherein the framed feature is transformed according to at least one of resolution, orientation, and line width.

29. A computer readable medium according to claim 24, wherein the transformed biometric image data is transformed according to its frame size.

30. A computer readable medium according to claim 24, wherein the transformed biometric image data is transformed according to a feature indicated in the parameters.

31. A computer readable medium according to claim 24, wherein the output image data is provided to one of a plurality of different compatible analysis applications.

32. A computer readable medium according to claim 31, wherein the step of transforming involves a same transform process for different ones of the compatible analysis applications, the same transform process transform result being variable in dependence upon the parameters.

33. A computer readable medium according to claim 24, wherein the captured image data is provided according to industry standard biometric imaging data formats.

34. A method for imaging a biometric surface according to claim 1, wherein the received transform data includes transform data for the transformed biometric image data, the transform data including a horizontal resolution $r_h$, a vertical resolution $r_v$, a number of pixels $a_h$ in a horizontal direction, a number of pixels $a_v$ in a vertical direction, and a data point depth $d_{bit}$, comprising the steps of:

determining an image area within the biometric surface for the sensed biometric image data, the image area having $A_h$ pixels in a horizontal direction and $A_v$ pixels in a vertical direction;

determining an image resolution of the sensed biometric image data, the image having a horizontal resolution $R_h$ and a vertical resolution $R_v$;

determining a data point depth $D_{bit}$ for the sensed biometric image data; and determining an area of interest within the image area, wherein the transforming step comprises the step of transforming at least one of $A_h$ to $a_h$, $A_v$ to $a_v$, $R_h$ to $r_h$, $R_v$ to $r_v$, and $D_{bit}$ to $d_{bit}$ for the area of interest.

35. A method for imaging a biometric surface according to claim 34, wherein if $A_h/R_h > A_h/r_h$, then calculating $A_h(A_h/R_h - A_h/r_h)/2$ as a representation of a number of pixels to be trimmed from both horizontal sides of the output image data.

36. A method for imaging a biometric surface according to claim 34, wherein if $A_v/R_v > A_v/r_v$, then calculating $A_v(A_v/R_v - A_v/r_v)/2$ as a representation of a number of pixels to be trimmed from both vertical sides of the output image data.

37. A method for imaging a biometric surface according to claim 36, wherein data points are removed in proportion to the number of pixels to be trimmed.

38. A method for imaging a biometric surface according to claim 36, wherein data points are interpolated to reconstruct the output image data as it would have been sensed if it were sensed at the transformed resolution.

39. A method for imaging a biometric surface according to claim 34, wherein if $A_h/R_h < A_h/r_h$, then calculating $A_h(A_h/R_h - A_h/r_h)/2$ as a representation of a number of pixels to be added to both horizontal sides of the output image data.

40. A method for imaging a biometric surface according to claim 34, wherein if $A_v/R_v < A_v/r_v$, then calculating $A_v(A_v/R_v - A_v/r_v)/2$ as a representation of a number of pixels to be added to both vertical sides of the output image data.

41. A method for imaging a biometric surface according to claim 40, wherein data points are interpolated to reconstruct the output image data as it would have been sensed if it were sensed at the transformed resolution.

42. A method for imaging a biometric surface according to claim 1, wherein the transforming step comprises the steps of:

determining an image of a known area relative to a feature of the sensed biometric image data;

during said transforming step, maintaining a resolution of said known area;

rotating the image area relative to the feature; and transforming a resolution of said image area such that a number of pixels along each axis is in accordance with a desired image size.

43. A computer readable medium according to claim 24, wherein the received transform data includes transform data for the transformed biometric image data, the transform data including a horizontal resolution $r_h$, a vertical resolution $r_v$, a number of pixels $a_h$ in a horizontal direction, a number of pixels $a_v$ in a vertical direction, and a data point depth $d_{bit}$, the data further including instructions for performing the steps of:

determining an image area within the biometric surface for the biometric image data, the image area having $A_h$ pixels in a horizontal direction and $A_v$ pixels in a vertical direction;

determining an image resolution of the biometric image data, the image having a horizontal resolution $R_h$ and a vertical resolution $R_v$;

determining a data point depth $D_{bit}$ for the biometric image data; and determining an area of interest within the image area, wherein the transforming step comprises the step of transforming at least one of $A_h$ to $a_h$, $A_v$ to $a_v$, $R_h$ to $r_h$, $R_v$ to $r_v$, and $D_{bit}$ to $d_{bit}$ for the area of interest.

44. A computer readable medium according to claim 43, wherein if $A_h/R_h > A_h/r_h$, then instructions are further included for calculating $A_h(A_h/R_h - A_h/r_h)/2$ as a representation of a number of pixels to be trimmed from both horizontal sides of the output image data.

45. A computer readable medium according to claim 43, wherein if $A_v/R_v > A_v/r_v$, then instructions are further included for calculating $A_v(A_v/R_v - A_v/r_v)/2$ as a representation of a number of pixels to be trimmed from both vertical sides of the output image data.

46. A computer readable medium according to claim 45, further including instructions for removing data points in proportion to the number of pixels to be trimmed.

47. A computer readable medium according to claim 45, further including instructions for interpolating the data points to reconstruct the output image data as it would have been sensed if it were sensed at the transformed resolution.

48. A computer readable medium according to claim 43, wherein if $A_h/R_h < A_h/r_h$, then instructions are further included for calculating $A_h(A_h/R_h - A_h/r_h)/2$ as a representation of a number of pixels to be added to both horizontal sides of the output image data.

49. A computer readable medium according to claim 43, wherein if $A_v/R_v < A_v/r_v$, then instructions are further included for calculating $A_v(A_v/R_v - A_v/r_v)/2$ as a representation of a number of pixels to be added to both vertical sides of the output image data.

50. A computer readable medium according to claim 49, further including instructions for interpolating data points to reconstruct the output image data as it would have been sensed if it were sensed at the transformed resolution.

51. A computer readable medium according to claim 24, wherein the transforming step comprises the steps of:

determining an image of a known area relative to a feature of the biometric image data;

during said transforming step, maintaining a resolution of said known area;

rotating the image area relative to the feature; and transforming a resolution of said image area such that a number of pixels along each axis is in accordance with a desired image size.

* * * * *